United States Patent [19]

Bergner

[11] Patent Number: 4,678,383
[45] Date of Patent: Jul. 7, 1987

[54] EXPANSION ANCHOR ASSEMBLY

[75] Inventor: Arndt Bergner, Munich, Fed. Rep. of Germany

[73] Assignee: Hilti Aktiengesellschaft, Fed. Rep. of Germany

[21] Appl. No.: 880,652

[22] Filed: Jun. 30, 1986

Related U.S. Application Data

[63] Continuation of Ser. No. 638,743, Aug. 8, 1984, abandoned.

[30] Foreign Application Priority Data

Aug. 17, 1983 [DE] Fed. Rep. of Germany ....... 3329732

[51] Int. Cl.$^4$ ............................................ F16B 13/04
[52] U.S. Cl. ........................................ 411/32; 411/39;
411/45; 411/55; 411/57; 411/75
[58] Field of Search ....................... 411/31, 32, 33, 39,
411/40, 41, 44, 45, 55, 57, 60, 61, 62, 71, 72, 73,
75, 76, 77, 78

[56] References Cited

U.S. PATENT DOCUMENTS

| | | | |
|---|---|---|---|
| 3,107,569 | 10/1963 | Lerick | 411/32 |
| 4,052,925 | 10/1977 | McCarthy | 411/57 |
| 4,293,259 | 10/1981 | Liebig | 411/32 |
| 4,339,217 | 7/1982 | Lacey | 411/55 |
| 4,482,277 | 11/1984 | Schiefer | 411/39 X |
| 4,484,848 | 11/1984 | Ott | 411/55 X |
| 4,519,735 | 5/1985 | Taylor | 411/44 |
| 4,523,880 | 6/1985 | Isler | 411/33 |

FOREIGN PATENT DOCUMENTS

| | | | |
|---|---|---|---|
| 223908 | 12/1957 | Australia | 411/55 |
| 0035095 | 9/1981 | European Pat. Off. | 411/57 |
| 2348873 | 4/1975 | Fed. Rep. of Germany | 411/33 |
| 2828983 | 1/1980 | Fed. Rep. of Germany | 411/32 |
| 3001902 | 7/1981 | Fed. Rep. of Germany | 411/57 |
| 2094919 | 9/1982 | United Kingdom | 411/57 |

*Primary Examiner*—Thomas J. Holko
*Attorney, Agent, or Firm*—Toren, McGeady & Associates

[57] ABSTRACT

An expansion anchor assembly for use in a bore with an undercut section adjacent the base of the bore, includes an axially elongated expansion sleeve and an anchor bolt positioned within the sleeve with an expansion cone at one end of the bolt. The expansion sleeve is slit from one end for a portion of its axial length. By drawing the expansion cone into the slit end of the sleeve, the sleeve can be expanded. An expansion element is seated within a recess in the outside surface of the sleeve. The base of the recess has a decreasing depth in the direction toward the slit end of the sleeve. The expansion element secures the expansion anchor assembly within the bore.

3 Claims, 3 Drawing Figures

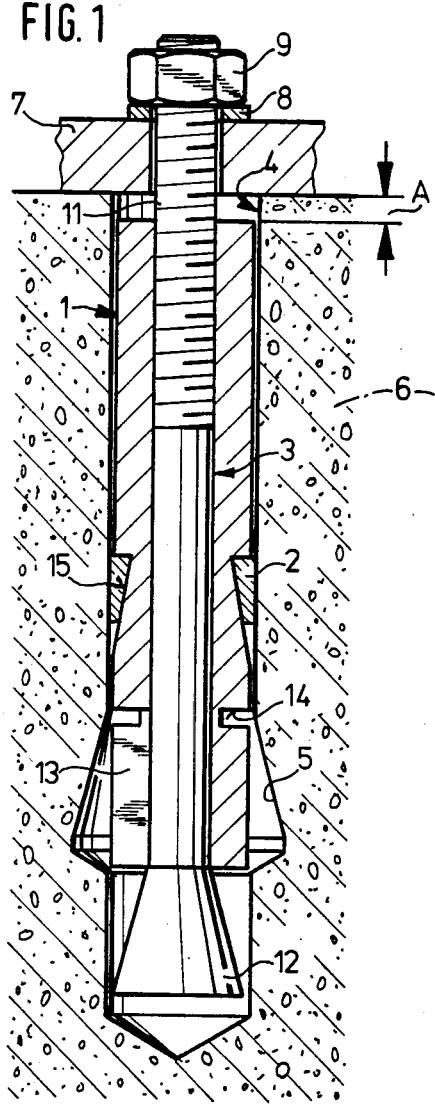
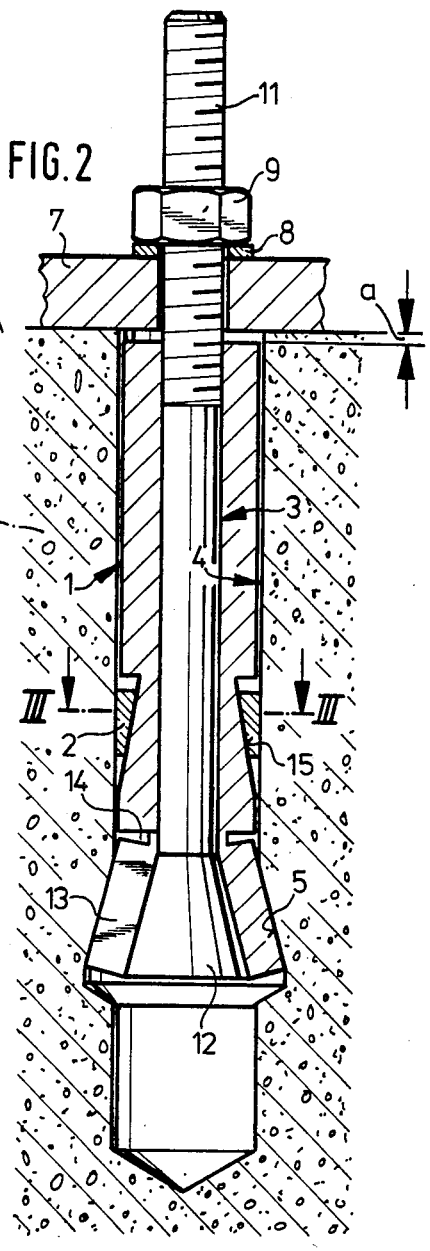
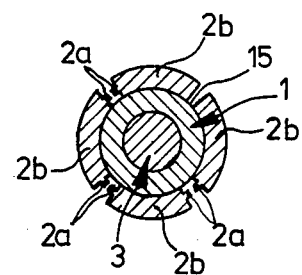

EXPANSION ANCHOR ASSEMBLY

This is a continuation of application Ser. No. 638,743, filed Aug. 8, 1984, now abandoned.

SUMMARY OF THE INVENTION

The present invention is directed to an expansion anchor assembly for use in a bore with an undercut or enlarged diameter section located adjacent the base of the bore. The expansion anchor assembly includes an expansion sleeve slit from one end in the axial direction and an anchor bolt which extends through the sleeve. At one end the anchor bolt has means for applying a load and at the opposite end it has an expansion cone which can be drawn into the sleeve for expanding the slit portion of the sleeve.

An expansion anchor assembly of the above-described type is inserted into a bore previously drilled in receiving material so that the trailing end of the anchor bolt projects outwardly from the bore. An object to be fastened to the surface of the receiving material containing the bore, such as a cover plate, is placed in contact with the surface of the receiving material so that the outwardly projecting end of the anchor bolt penetrates through and outwardly from the object. For example, the means for applying a load can be an external thread on the anchor bolt onto which a nut can be screwed so that the anchor bolt is withdrawn from the bore. In such an operation, the nut is supported against the object to be secured to the receiving material. As the anchor bolt is withdrawn, the expansion cone, located on the end of the bolt within the bore, moves into the axially slit part of the expansion sleeve as soon as the sleeve is held against axial displacement along with the bolt. As the expansion cone moves into the axially slit part of the sleeve, the sleeve is expanded into form-locking engagement with the undercut or enlarged portion of the bore so that the anchor assembly is secured within the receiving material.

The disadvantages of such a known expansion anchor assembly include that, due to the lack of adequate frictional forces between the expansion sleeve and the bore, the axial displacement of the sleeve is prevented only when the sleeve contacts the object to be fastened. Since, based on experience, the object to be fastened often rests in a state of hollow contact with the surface of the receiving material which may not be flat, the trailing end of the sleeve extends outwardly from the surface of the receiving material by the extent of the hollow contact. As a result, the object to be fastened is supported against the outwardly projecting end of the expansion sleeve so that full contact of the object with the receiving material surface is not possible while removing the hollow contact.

Due to the undefined extent of such hollow contacts, the expansion sleeve often reaches an axially undefined position before the expansion process is effected so that ineffective contact of the axially slit part of the sleeve with the undercut of the bore, located at a particular depth of the bore, takes place which impairs the anchoring value of the expansion anchor assembly.

Therefore, it is the primary object of the present invention to provide an expansion anchor assembly of the type described above which assures the removal of any hollow contacts of the object to be fastened with the surface of the receiving material and to provide high anchoring values by affording an axially defined insertion of the expansion sleeve. This result is achieved by providing an expansion element in a recess located on the outside surface of the sleeve with the base of the recess having a decreasing depth in the direction toward the end of the sleeve on which the expansion cone is located.

With an expansion element provided on the outside surface of the expansion sleeve, in accordance with the invention, there is the effect, while the bolt is being retracted or withdrawn from the bore, that the expansion sleeve is axially displaced for only a minimum distance, because the expansion element at the commencement of the axial movement of the expansion sleeve is forced radially outwardly due to the inclination of the base of the recess relative to the axis of the sleeve. The expansion element is forced radially outwardly into frictional contact with the surface of the bore. With the expansion sleeve held against axial displacement out of the bore, the expansion cone on the anchor bolt then moves axially into the axially slit part of the expansion sleeve displacing the slit part radially outwardly. Therefore, to achieve the anchoring effect it is not necessary that the end of the expansion sleeve bears against the object to be secured so that any areas of hollow contact can be removed by tightening the expansion anchor and drawing the object against the surface of the receiving material. Furthermore, the axially slit part of the expansion sleeve which is expanded into a frusto-conical shape, since the expansion sleeve has experienced only minimum axial displacement, is seated within the undercut portion of the bore in a form-locking manner and maximum anchoring values are achieved. Accordingly, it is possible to provide a defined position of the expanded portion of the expansion sleeve so that its positive interengagement with the undercut portion of the bore can be assured.

The shape of the recess in the outside surface of the expansion sleeve, which serves as the running surface for the expansion element as the sleeve moves axially out of the bore, may be linear, and the depth of the recess inwardly from the outside surface of the expansion sleeve may decrease toward the end of the sleeve into which the expansion cone moves, or, to provide an increased final expansion, it may be provided with an increasingly curved shape. Metals as well as plastics are suitable for forming the expansion element.

To separate the step of expanding the axially slit part of the expansion sleeve from the step of expanding the expansion element, preferably the recess is formed in the axially extending part of the sleeve which is not slit. In this way, a defined sequence of the expanding steps is possible. Accordingly, the expansion element can be fixed in a cylindrically shaped section of the bore with the axially slit part of the sleeve being located in the axial region of the bore which is undercut.

To afford a uniform pressure distribution, it is preferred if the recess extends circumferentially or annularly around the outside surface of the expansion sleeve.

To afford a flat, tilt-free movement of the expansion element on the base surface of the recess, the expansion element, in accordance with the invention, is wedge-shaped in radial section.

In one embodiment of the invention, the expansion element is shell-shaped. Preferably the circumferential recess formed in the outside surface of the expansion sleeve can be filled at the deeper end of the recess by the shell-shaped expansion element. If the expansion element extends around the expansion sleeve for an angle of more than 180°, then the expansion element is firmly held within the recess without any special holding means. The shell-shaped expanding element may consist of several sections connected together by webs forming predetermined breaking points. It is possible to secure several segments on the expansion sleeve by a holding band which encloses the segments.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending view, partly in section, showing an expansion anchor assembly inserted into a bore containing an undercut section, with the assembly in the unexpanded state;

FIG. 2 is a view similar to FIG. 1 but illustrating the expansion anchor assembly in the expanded state; and FIG. 3 is a sectional view taken along the line III—III in FIG. 2.

DETAILED DESCRIPTION OF THE INVENTION

In FIGS. 1 and 2 an expansion anchor assembly is illustrated made up of an axially extending expansion sleeve 1, a shell-shaped expansion element 2 and an axially extending anchor bolt 3 extending through the sleeve.

As viewed in FIGS. 1 and 2, the first or leading end of the expansion sleeve 1 and of the anchor bolt 3 is the lower end and the second or trailing end is the upper end, in other words, when the assembly is inserted into the bore 4 drilled into the receiving material 6 the first or leading end is inserted first. The bore 4 has an undercut or radially enlarged axially extending section 5 adjacent the base of the bore. The undercut 5 is frusto-conically shaped with the larger diameter end of the undercut being located closer to the base of the bore. The expansion anchor assembly is used to secure a flat object 7 to the surface of the receiving material 6. A washer 8 is held against the outside surface of the object 7 by a nut 9 threaded onto the second end of the anchor bolt so that a load can be applied to the assembly. The load is applied by turning the nut around the external thread 11 so that force is applied against the object 7 through the medium of the washer 8 and the bolt is partially withdrawn out of the bore 4. At its first end, the anchor bolt 3 has a frusto-conical expansion cone. As shown in FIG. 1, in the condition of the assembly when it is inserted into the bore 4 before the expansion procedure is effected, the cone extends out of the first end of the expansion sleeve. In the expanding procedure, the expansion cone 12 is drawn into the first end of the sleeve. The expansion sleeve 1, extending from its first end, has axially extending slits or slots 13 which facilitate the radial expansion of the sleeve into the undercut 5 in the bore 4. The slits 13 extend from the first end to a groove 14 extending circumferentially around the outside surface of the sleeve. The slits 13 terminate at the groove 14. The groove 14 affords a hinge-like connection of the slotted portions of the expansion sleeve so that they can be displaced radially outwardly as the expansion cone is drawn into the first end of the sleeve. Spaced along the outside surface of the sleeve from the groove 14 toward the second end of the sleeve is a circumferentially extending recess 15 into which the expansion element 2 is fitted. As viewed in FIGS. 1 and 2, the base of the recess 15 extends at an angle relative to the axis of the sleeve and of the anchor bolt. The depth of the recess is greater closer to the second end of the sleeve so that the depth decreases in the direction toward the first or leading end of the sleeve.

As shown in FIG. 1, the expansion anchor assembly is inserted into the bore so that the trailing or second end of the sleeve is spaced inwardly from the surface of the receiving material by the dimension A which corresponds to several millimeters.

To secure the expansion anchor assembly within the bore 4 in the receiving material 6, the nut 9 is threaded onto the external thread 11 at the second end of the anchor bolt so that a tension stress is exerted on the bolt by the combination of the nut 9, the washer 8, the object 7 bearing against the receiving material 6 so that the anchor bolt 3 along with the expansion cone 12 at its first end is moved axially in the direction out of the bore 4. During the initial phase of the displacement of the assembly, the anchor bolt 3 carries the expansion sleeve 1 by means of its expansion cone 12 in the direction out of the bore without providing any radial widening of the axially slit part of the expansion sleeve 1. During this initial phase, due to the frusto-conical configuration of the recess 15 and the movement of the sleeve relative to the expansion element 2 which bears frictionally against the inside surface of the bore, the expansion element is pressed radially outward increasing the frictional contact. During this minor axial displacement of the expansion sleeve, the frictional contact of the expansion element 2 with the inside surface of the bore secures the expansion sleeve against any further axial movement in the bore, while maintaining a residual distance a between the second end of the sleeve and the outside surface of the receiving material 6, note FIG. 2. With the expansion sleeve 1 held against the further axial movement, by continuing to withdraw the anchor bolt 3 out of the bore, the expansion cone 12 moves into the axially slit part of the expansion sleeve 1 and this slit part is pressed radially outwardly, in a form-locking manner, into the undercut 5 of the bore and into contact with the surface of the bore within the undercut. The expansion anchor is secured within the receiving material 6 and the object 7 is pressed against the surface of the receiving material and any areas of hollow contact between the adjacent surfaces of the object and the receiving material are cancelled out.

In FIG. 3, the expansion element 2 is displayed in the expanded state. Before expansion, the element 2 is formed of four circumferentially extending segments 2b interconnected by webs 2a. As can be seen in FIG. 3, the webs 2a have a much smaller dimension in the radial direction than the segments 2b so that during the expanding action, the webs break separating the expansion element into a plurality of segments. While the expansion element 2 is shown made up of the webs 2a and the segments 2b, it can be appreciated that the expansion element can be formed in a number of different ways. Preferably, the inside surface of the expansion element is frusto-conically shaped complementary to the frusto-conical shape of the base of the recess 15. This arrangement with the inside surface of the expansion element 2 in sliding contact with the base surface of the recess 15 permits the tilt-free movement of the expansion element within the recess. The frusto-conical shape of the inside surface of the expansion element provides the element with a wedge-shaped radial section. As can be seen in FIG. 1, the outside surface of the expansion element 2 is dimensioned so that it is in frictional contact with the surface of the bore 4 whereby the desired expansion action of the element can be achieved and the expansion sleeve 1 can be held against any further axial displacement.

In FIG. 2 where the axially slit part of the expansion sleeve is displaced radially outwardly, it can be noted that the portion of the sleeve between the base of the groove 14 and the inside surface of the sleeve forms a hinge-like connection for the slit parts so that they can more easily be displaced radially outwardly relative to the remainder of the sleeve.

While specific embodiments of the invention have been shown and described in detail to illustrate the application of the inventive principles, it will be understood that the invention may be embodied otherwise without departing from such principles.

I claim:

1. An expansion anchor assembly to be secured in a bore with an undercut section located in the surface of the bore adjacent the base thereof, said expansion anchor assembly comprises an axially elongated expansion sleeve having a first end arranged to be inserted first in the bore and a second end, said sleeve being slit in the axial direction for a portion of the axial length thereof from the first end toward the second end, said sleeve having an axially extending length so that the second end thereof is recessed inwardly from the opening into the bore, an axially elongated anchor bolt located within and extending completely through said expansion sleeve, said anchor bolt having a first end located in the region of the first end of said expansion sleeve and a second and extending outwardly from the second end of said expansion sleeve, said anchor bolt having an expansion cone formed on the first end thereof with said cone arranged to be drawn into the first end of said sleeve for radially outwardly expanding the slit portion of said sleeve into the undercut section in the bore formed on the second end of said anchor bolt for applying a load, said expansion sleeve having an axially extending cylindrically shaped outside surface of a constant diameter between the first and second ends thereof with a circumferentially extending annular recess formed therein extending radially inwardly from said outside surface, said recess is located in the axially extending part of said expansion sleeve spaced from and between said slit portion thereof and the second end of said expansion sleeve, said annular recess having an annular base extending in the axial direction of said sleeve and spaced radially inwardly from the outside surface decreasing in the direction toward the first end of said expansion sleeve, and annular expansion element seated within said recess with a cylindrically shaped radially outer surface on said expansion element extending in the axial direction of said annular recess for a dimension less than the axial extent of said recess and said radially outer surface extending outwardly at least to the outside surface of said expansion sleeve, said expansion element has a radially inner surface and a radially outer surface with the radially inner surface in contact with the base of said recess and said sleeve whereby said inner surface tapers inwardly toward the axis of said sleeve in the direction toward the second end of said sleeve, and with the radially outer surface of said expansion element arranged to effect frictional contact with the surface of the bore during the radial expansion of said expansion sleeve for preventing axial displacement of expansion sleeve out of the bore while said expansion cone radially displaces and expands the slit portion of said sleeve into anchoring engagement with the undercut section of the bore.

2. An expansion anchor assembly, as set forth in claim 1, wherein said expansion element has a shell-shaped construction.

3. An expansion anchor assembly, as set forth in claim 1, wherein said expansion element extends annularly around said expansion sleeve within said recess and is formed of a plurality of circumferentially extending segments interconnected by webs with said webs having a dimension in the radial direction considerably smaller than the comparable dimension of said segments so that said webs form predetermined breaking points when said expansion element is expanded radially.

* * * * *